(12) United States Patent
Narasimhan (10) Patent No.: US 7,885,607 B1
(45) Date of Patent: *Feb. 8, 2011

(54) APPARATUS AND METHOD FOR MEASURING SIGNAL QUALITY OF A WIRELESS COMMUNICATIONS LINK

(75) Inventor: Ravi Narasimhan, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,262

(22) Filed: Oct. 6, 2009

Related U.S. Application Data (63) Continuation of application No. 11/346,503, filed on Feb. 2, 2006, now Pat. No. 7,599,663, which is a continuation of application No. 10/322,130, filed on Dec. 17, 2002, now Pat. No. 7,016,651.

(51) Int. Cl.
H04B 17/00 (2006.01)
(52) U.S. Cl. .................. 455/67.11; 455/135; 455/140; 455/63.1
(58) Field of Classification Search .............. 455/67.11, 455/135, 136, 434, 127.1, 226.1, 226.2, 226.3, 455/69, 114.2, 67.13; 370/208, 210, 252, 370/465, 338, 328, 345, 203, 343, 236, 231, 370/410, 204, 206; 714/779; 375/200, 206, 375/261, 267, 356, 346, 326, 265, 340
See application file for complete search history.

(56) References Cited

U.S. PATENT DOCUMENTS

| | | | |
|---|---|---|---|
| 5,657,354 A | 8/1997 | Thesling et al. | |
| 5,752,226 A | 5/1998 | Chan et al. | |
| 5,867,478 A | 2/1999 | Baum et al. | |
| 6,032,114 A | 2/2000 | Chan | |
| 6,215,772 B1 * | 4/2001 | Verma | 370/236 |
| 6,304,996 B1 | 10/2001 | Van Stralen et al. | |
| 6,442,129 B1 * | 8/2002 | Yonge et al. | 370/204 |
| 6,480,554 B1 | 11/2002 | Toskala et al. | |
| 6,625,236 B1 * | 9/2003 | Dent et al. | 375/341 |
| 6,690,715 B2 | 2/2004 | Webster et al. | |
| 6,725,411 B1 | 4/2004 | Gerlach et al. | |
| 6,731,595 B2 | 5/2004 | Matsumoto | |

(Continued)

OTHER PUBLICATIONS

IEEE std 802.16-2004, (Revision of IEEE std. 802.16-2001), IEEE Standard for Local and metropolitan area networks, Part 16; Air Interface for Fixed Broadband Wireless Access Systems, IEEE Computer Society and the IEEE Microwave Theory and Techniques Society, Sponsored by the LAN/MAN Standards Committee, 893 pages.

(Continued)

Primary Examiner—Tan Trinh (57) ABSTRACT

A transceiver includes a receiver configured to receive a radio frequency (RF) signal via a wireless communication link. The wireless link has a predetermined link characteristic. The RF signal includes a plurality of encoded Orthogonal Frequency Division Modulation (OFDM) symbols. A receive baseband processor recovers each OFDM symbol encoded within the RF signal. The baseband processor includes an estimation unit configured to continuously measure a signal quality of the wireless communication link based on each recovered OFDM symbol. A MAC layer controller is configured to selectively alter the predetermined link characteristic of the wireless link on an ongoing basis based on the continuously measured signal quality of the wireless communication link.

11 Claims, 4 Drawing Sheets

U.S. PATENT DOCUMENTS

| | | | |
|---|---|---|---|
| 6,763,075 | B2 * | 7/2004 | Zhengdi et al. ............ 375/341 |
| 7,016,651 | B1 * | 3/2006 | Narasimhan ............ 455/67.11 |
| 7,031,405 | B1 | 4/2006 | Touzni et al. |
| 7,173,990 | B2 | 2/2007 | Kim et al. |
| 7,177,377 | B2 | 2/2007 | Wu et al. |
| 7,327,800 | B2 * | 2/2008 | Oprea et al. ............... 375/267 |
| 7,389,470 | B2 | 6/2008 | Heo et al. |
| 7,400,686 | B2 | 7/2008 | Borran et al. |
| 7,421,030 | B2 | 9/2008 | Bolinth et al. |
| 7,430,257 | B1 | 9/2008 | Shattil |
| 7,599,663 | B1 * | 10/2009 | Narasimhan ............ 455/67.11 |
| 2002/0188908 | A1 * | 12/2002 | Yonge et al. ............... 714/779 |
| 2003/0099285 | A1 | 5/2003 | Graziano et al. |
| 2003/0115061 | A1 | 6/2003 | Chen |
| 2003/0118094 | A1 | 6/2003 | Wang et al. |
| 2008/0062888 | A1 | 3/2008 | Lusky et al. |

OTHER PUBLICATIONS

IEEE std. 802.11a-1999, Sponsor LAN MAN Standards Committee of IEEE Computer Society, "Part 11: Wireless LAN Medium Access Control (MAC) and Physical Layer (PHY) Specifications, High-Speed Physical Layer Extension in the 5 GHz Band," Sep. 1999, pp. 1-83.

IEEE Std 802.11g/D2.8, May 2002 (Supplemental to ANSI/IEEE Std 802.11, 1999 Edition) DRAFT Supplement to STANDARD [for] Information Technology-Telecommunications and information exchange between systems-Local and metropolitan area networks-Specific requirements-Part 11: Wireless LAN Medium Access Control (MAC and Physical Layer) PHYO specifications: Further Higher-Speed Physical Layer Extension in the 2.4 GHz Band; LAN/MAN Standards Committee of the IEEE Computer Society; 2002; 53 pages.

IEEE Std 802.11b-1999 (Supplement to ANSI/IEEE Std 802.11, 1999 Edition) Supplement to IEEE Standard for Information technology-Telecommunications and information exchange between systems—Local and metropolitan area networks—Specific requirements—Part 11: Wireless LAN Medium Access Control (MAC) and Physical Layer (PHY) specifications: Higher—Speed Physical Layer Extension in the 2.4 GHz Band; LAN/MAN Standards Committee of the IEEE Computer Society; Approved Sep. 16, 1999; 96 pages.

International Standard, ANSI/IEEE std. 802.11, first edition, Sponsor LAN MAN Standards Committee of IEEE Computer Society, "Part 11: Wireless LAN Medium Access Control (MAC) and Physical Layer (PHY) specifications," 1999.

IEEE P802.16a/D2-2002, Sponsor LAN MAN Standards Committee of IEEE Computer Society, "Local and Metropolitan Area Networks—Part 16: Air Interface for Fixed Broadband Wireless Access Systems," Feb. 7, 2002, pp. 1-253.

J.M. Cioffi, "Chapter 4: Multi-Channel Modulation", pp. 276-393 (2002.

Non-Final Office Action mailed Apr. 1, 2008 for U.S. Appl. No. 11/346,503, filed Feb. 2, 2006; 12 pages.

Amendment filed Jul. 24, 2008 in response to Non-Final Office Action mailed Apr. 1, 2008 for U.S. Appl. No. 11/346,503, filed Feb. 2, 2006; 17 pages.

Non-Final Office Action mailed Nov. 14, 2008 for U.S. Appl. No. 11/346,503, filed Feb. 2, 2006; 11 pages.

Amendment filed Feb. 16, 2009 in response to Non-Final Office Action mailed Nov. 14, 2008 for U.S. Appl. No. 11/346,503, filed Feb. 2, 2006; 21 pages.

* cited by examiner

APPARATUS AND METHOD FOR MEASURING SIGNAL QUALITY OF A WIRELESS COMMUNICATIONS LINK

CROSS-REFERENCE TO RELATED APPLICATIONS

This application is a continuation of U.S. patent application Ser. No. 11/346,503, filed Feb. 2, 2006, which is a continuation of U.S. patent application Ser. No. 10/322,130 (now U.S. Pat. No. 7,016,651), filed Dec. 17, 2002. The disclosures of the above applications are incorporated herein by reference in their entirety.

TECHNICAL FIELD

The present invention generally relates to wireless communications, and more specifically, to a method and apparatus for measuring signal quality of a wireless communications link which features geometric signal-to-noise ratio estimation.

BACKGROUND

The past few years has witnessed the ever-increasing availability of relatively cheap, low power wireless data communication services, networks and devices, promising near wire speed transmission and reliability. One technology in particular, described in the IEEE Standard 802.11a (1999) and Draft IEEE Standard 802.11g (2002) High Rate PHY Supplements to the ANSI/IEEE Standard 802.11, 1999 edition, collectively incorporated herein fully by reference, has recently been commercialized with the promise of 54 Mbps effective bandwidth, making it a strong competitor to traditional wired Ethernet and the more ubiquitous "802.11b" or "WiFi" 11 Mbps mobile wireless transmission standard.

IEEE 802.11a and 802.11g or "802.11a/g" compliant transmission systems achieve their high data transmission rates through using Orthogonal Frequency Division Modulation or OFDM encoded symbols mapped up to 64 QAM multicarrier constellations and beyond. Generally, OFDM works generally by dividing one high-speed data carrier into multiple low speed sub-carriers which are used for transmission of data in parallel. Put another way, the data stream of interest is divided into multiple parallel bit streams, each transmitted over a different sub-carrier having a lower effective bit rate. Before final power amplification and transmission, the multicarrier OFDM symbol encoded symbols are converted into the time domain using Inverse Fast Fourier Transform techniques resulting in a relatively high-speed time domain signal with a large peak-to-average ratio (PAR). OFDM is also used in fixed broadband wireless access systems such as proposed in IEEE Standard 802.16a: Air Interface for Fixed Broadband Wireless Access Systems Part A: Systems between 2 and 1 GHz, Draft working document, February 2002, ("802.16a") which is incorporated herein fully by reference.

In the case of 802.11a and 802.11g, there are up to 52 defined sub-carriers or tones, of which 48 are available to carry data (the 4 remaining are pilot sub-carriers or tones, which bear predetermined data). These sub-carriers are substantially orthogonal to each other, so they can be spaced closer together than in conventional frequency division multiplexing. Mathematically, the integral of the product of any two orthogonal sub-carriers is zero. This property allows the separating of sub-carriers at the receiver without interference from other sub-carriers.

Even where wireless communications leverage orthogonal sub-carrier techniques such as provided in 802.11a/g, they are still subject to environmental effects which can distort, disrupt or inject noise, thereby at least intermittently impact effective data throughput or other aspects of communications link quality or performance. Thus, planning and accommodating for foreseeable environmental effects is an important part of wireless communications system design, and providing a system that is responsive to such effects and self-heals or adapts link characteristics or operational parameters is desirable. In an 802.11a/g implementation, link characteristics such as data transmission rate, convolutional coding rate, packet/frame size, transmit power, receiver gain, and frequency selection can be altered to preserve the link in deteriorating conditions, as well as to upgrade effective data throughput in the link when conditions improve. To this end, it would be advantageous to provide a wireless communications system capable of assessing communications link quality or performance, and adapt link characteristics in accordance with such assessed quality or performance. Further, It would be advantageous if a measure of such link quality or performance can be accurately obtained in a computationally efficient manner, to provide a parameter useful for efficient link management and adaptation.

SUMMARY OF THE INVENTION

The present invention is directed in part to an apparatus and method for measuring signal quality in a communications link that supports transfer of OFDM symbols modulating data across a plurality of sub-carriers. The apparatus includes a link interface capable of receiving an OFDM symbol from the communications link, and a signal-to-noise ratio (SNR) estimation unit to generate an estimate of a geometric SNR for the OFDM symbol based on a function of a soft decision and a hard decision for the OFDM symbol. A signal quality of the communications link is based on the geometric SNR estimate. This arrangement results in a computationally efficient yet accurate way to assess link signal quality, and selectively perform link characteristic alteration based on the SNR estimate.

In accordance with at least one disclosed embodiment of the invention, only a subset of the plurality of sub-carriers need be used to derive a relatively accurate geometric SNR estimate for signal quality assessment purposes. The subset need not be ordered or spaced apart in the sub-carrier constellation in a particular manner, as long as a sufficient number of sub-carriers are selected as subset members to constitute a representative sample of all the sub-carriers. This results in an even more computationally efficient technique to assess signal quality.

Moreover, in accordance with at least one disclosed embodiment, soft decisions of the likely transmitted symbols used to calculate the estimated geometric SNR may be provided by a demodulation/frequency domain equalizer (FEQ). Though not required, this demodulation unit/FEQ may be arranged such that several of the calculation units may be shared between it and the SNR estimation unit, as several of the involved calculations are similar.

Further, in accordance with at least one disclosed embodiment, hard decisions of the likely transmitted symbols used to calculate the estimated geometric SNR may be provided by either a slicer or a Viterbi decoder followed by an OFDM re-coder. The slicer alternative provides the hard-decision relatively quickly, whereas the Viterbi decoder alternative is at least potentially more accurate in predicting the transmitted symbol.

DETAILED DESCRIPTION OF EMBODIMENTS OF THE INVENTION

Figure 1:
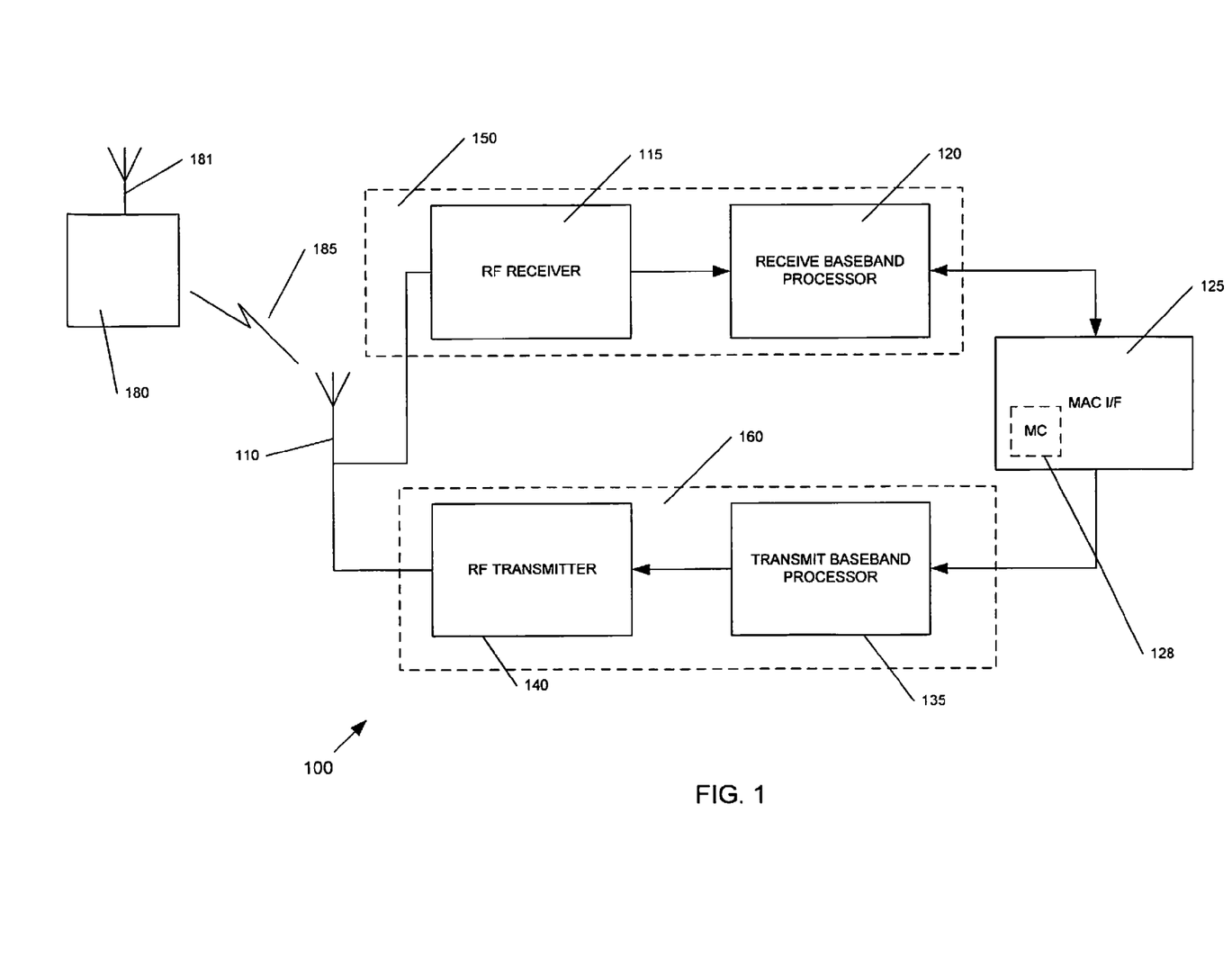
FIG. 1 is a functional block diagram of a transceiver according to an embodiment of the invention.
Figure 2:
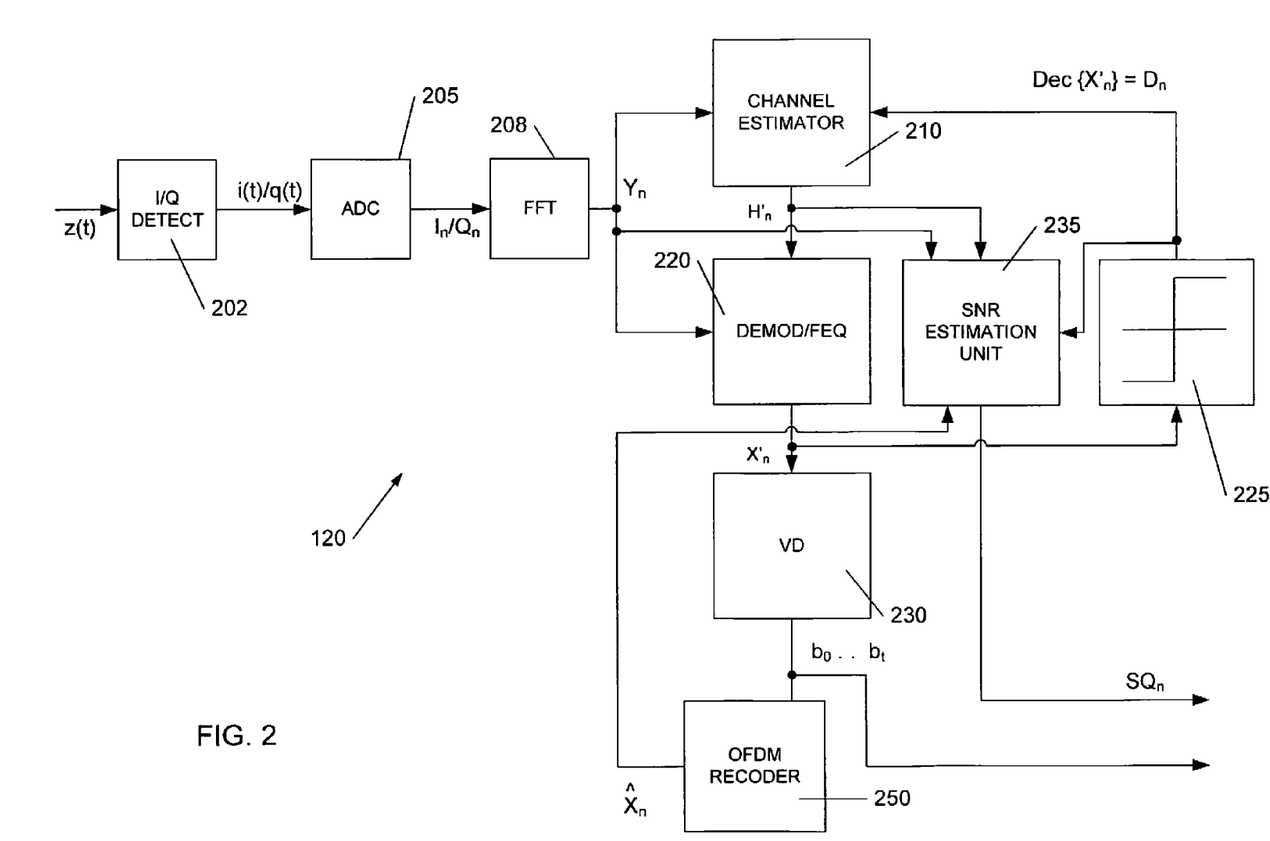
FIG. 2 is a more detailed functional block diagram of the receiver baseband processor shown in FIG. 1.

FIG. 1 illustrates a wireless communications transceiver 100 according to an embodiment of the present invention, including the receiver baseband processing unit 120 shown in more detail in FIG. 2. In this embodiment, inbound RF signals conveying a 802.11a/g compliant PLCP frame of OFDM encoded symbols are picked up by the duplex antenna 110 and routed to the RF receiver unit 115 of a receiver 150 consistent with the present invention. This frame originated from another 802.11a/g transceiver, such as remote station 180. If the remote station 180 originated transmission of the frame, RF signals conveying the frame would radiate from antenna 181 of the station, cross a wireless medium (not shown) interposing the station 180 and the transceiver 100 and would be picked up by the antenna 110.

The RF receiver unit 115 performs routine downconversion and automatic gain control of these inbound RF signals, and presents an analog baseband signal containing at least one frame of 802.11a/g OFDM symbols to the receive baseband processor 120. Generally speaking, the receive baseband processor 120 performs symbol demodulation of the each inbound 802.11a/g compliant frame to recover bitstream data for receiver synchronization (preamble), frame or packet definition (header), or the actual inbound data of interest (payload). As will be described in more detail below with reference to FIGS. 2 and 3, the receive baseband processor 120 includes a geometric signal-to-noise ratio ($SNR_{geo}$) estimation unit 235 to measure signal quality and provide a signal quality parameter (SQ) to the MAC layer controller 128 of the MAC interface 125, a type of network interface bridging the OSI layer 1 PHY transceiver with higher layer (OSI 2+) networks and applications serviced by the transceiver. The SQ parameter is indicative of the perceived or measured signal quality of the 802.11a/g wireless communications link established between the transceiver 100 and the originator of the RF signals conveying the inbound OFDM frame, such as an 802.11a/g access point or another 802.11a/g client transceiver. Though not required, in this embodiment, SQ is equal to the $SNR_{geo}$ estimate on the decibel scale. In other embodiments with different SQ assessment considerations, SQ may correspond to or otherwise be based on, but not necessarily be equal to the $SNR_{geo}$ estimate.

Once recovered by the receive baseband processor 120, the inbound data contained in each received 802.11a/g formatted frame (i.e. the frame payload or PSDU) is delivered to a the MAC layer interface 125 in the form of a MAC layer PPDU (a type of data unit) and then on to higher layer applications and devices being serviced by the transceiver 100. Outbound data intended for wireless transmission originating from the device(s) or application(s) being serviced by the transceiver 100 are delivered to the transmit baseband processor 135 of the transmitter 160 from the MAC interface 125 using, e.g. one or more MAC layer PPDUs. The transmit baseband processor 135 formulates appropriate 802.11a/g frame preamble and header information, and OFDM symbol encodes the outbound data to generate one or more complete outbound 802.11a/g frames. As the frame or packet is being developed, it is converted into analog form suitable for upconversion and RF transmission by the RF transmitter unit 140 consistent with 802.11a/g physical layer requirements.

The MAC layer controller 128 handles PLCP functions consistent with the present invention as well as specified in the 802.11a/g standards, including at least periodically monitoring quality of the wireless communications link between the PMD portion of the transceiver (i.e. the receiver 150, antenna 110, and transmitter 160) and the remote station(s) the transceiver 100 either sends PLCP frames to or receives PLCP frames from, such as the station 180 shown in FIG. 1. This wireless communications link, conceptually shown in FIG. 1 (reference numeral 185) spanning station 180 and the transceiver antenna 110, defines at least one static or dynamically allocated carrier RF frequency or channel within a set of available channels defined in the 802.11a and/or 802.11g standards which may be used to bear the PLCP frame traffic between the station 180 and the transceiver 100. The communications link 185 also defines a number of characteristics relating to how the PLCP frames are to be transmitted, including the agreed upon convolutional coding and data transmission rates, packet length (particularly the size of the PPDU or payload conveyed per frame), as well as transmitter power used to radiate the outbound frames. The communications link further includes individual receiver characteristics, including receiver gain or sensitivity settings and receive antenna selection (in a multiple receiver antenna deployment—not shown in FIG. 1).

Consistent with 802.11a and 802.11g standards, the MAC layer controller 128 can selectively alter link characteristics of the communications link 185 on an ongoing basis based on, e.g. perceived signal strength, channel availability and/or interference on an ongoing basis through the use of known 802.11a/g primitives. In so doing, the MAC layer controller 128 may issue 802.11a/g primitives to the transceiver PMD causing the PMD to locally alter link characteristics as well form and cause the PMD to issue frames over the communications link 185 to the remote station 180 to induce changes in link characteristics at the remote end. Moreover, in the present embodiment, the MAC layer controller 128 also includes logic to evaluate the SQ parameter supplied by the $SNR_{geo}$ estimation unit 235 (FIGS. 2 and 3) and selectively alter one or more communications link characteristics in response thereto. For example, the MAC layer 128 may track the change in a scalar SQ value over time and cause the transceiver PMD and/or the remote station to increase the data transmission rate and, consequently, the effective data throughput of the communications link, if the SQ parameter increases in value (e.g. ratchet up effective throughput from 24 Mbps to 54 Mbps through selecting use of a 64-QAM modulation constellation instead of a 16-QAM modulation constellation), as well as back off such throughput when SQ falls over time. This is because, according to the present embodiment, a relatively high SQ parameter indicates a very clean (or relatively noiseless) communications link that can tolerate maximum effective data throughput without appreciable data loss, as the SQ parameter here is directly related to an estimate of the $SNR_{geo}$ for the communications link, such as the link 185, measured at the receiver. Likewise, a low SQ parameter indicates a low $SNR_{geo}$ and the presence of a noisy reception environment and/or reduced inbound signal strength at the receiver. In such case, a less aggressive transmission rate may provide acceptable decoding accuracy and processing gain.

Referring again to FIG. 1, it should be appreciated that only a single duplex antenna arrangement is shown in FIG. 1, the transceiver 100 can be easily adapted to incorporate multiple receive pathways or chains to take advantage of selection diversity or MRC diversity techniques. Likewise, though not shown in FIG. 1, transmit diversity techniques may be employed in addition or in the alternative as would be understood by those skilled in the art.

Also, though not shown in FIG. 1, the transceiver 100 may form an operational part of a network interface apparatus such as a PC card or network interface card capable of interfacing with the CPU or information processor of an information processing apparatus such as a desktop or laptop computer, and may be integrated within and constitute a part of such information processing apparatus. This network interface apparatus may alternatively form an operational component of a wireless communications access point such as a base station as will be appreciated by those ordinarily skilled in the art.

As noted above and consistent with IEEE 802.11a/g standards, the receiver 150 of the transceiver 100 of the present embodiment includes an RF receiver 115 to handle RF downconversion and filtering of received signals in one or more stages and a receive baseband processor 120 to demodulate OFDM encoded symbols bearing the data of interest present in the analog baseband signal recovered by the RF receiver 115. This receive baseband processor 120 now be explored in more detail with reference to FIG. 2. Here, the recovered analog baseband signal z(t) generated by the RF receiver 115 is provided to the input of the I/Q detector 202 to recover analog in-phase (i) and quadrature-phase (q) signals, which are then fed to the analog to digital converter 210. These i and q signals are then converted into their respective digital counterpart signal components I and Q, with each bearing digital data in the time domain. Next, the I and Q components are sent to the FFT 208 for conversion into the frequency domain and recovery of the OFDM symbols present therein. In fact, the FFT 208 recovers the 52 modulated sub-carrier signals $Y_1 \ldots Y_{52}$ or forming each received OFDM symbol borne by the time domain I and Q signals. As used herein, the notation $Y_n$ represents the nth OFDM symbol within the received PLCP frame, and $Y_{n,k}$ represents the kth individual sub-carrier signal forming such OFDM symbol $Y_n$. The relationship between each sub-carrier of a given OFDM signal $Y_n$ and it's transmitted counterpart symbol sub-carrier ($X_{n,k}$) may be generally expressed as:

$$Y_{n,k} = H_{n,k} X_{n,k} + N_{n,k} \quad (1)$$

where $H_{n,k}$ is the actual channel response or channel estimate for sub-carrier $Y_{n,k}$, and $N_{n,k}$ represents intervening noise, including Additive White Gaussian Noise present in the kth sub-carrier or tone during transmission of the nth OFDM symbol.

Figure 3:
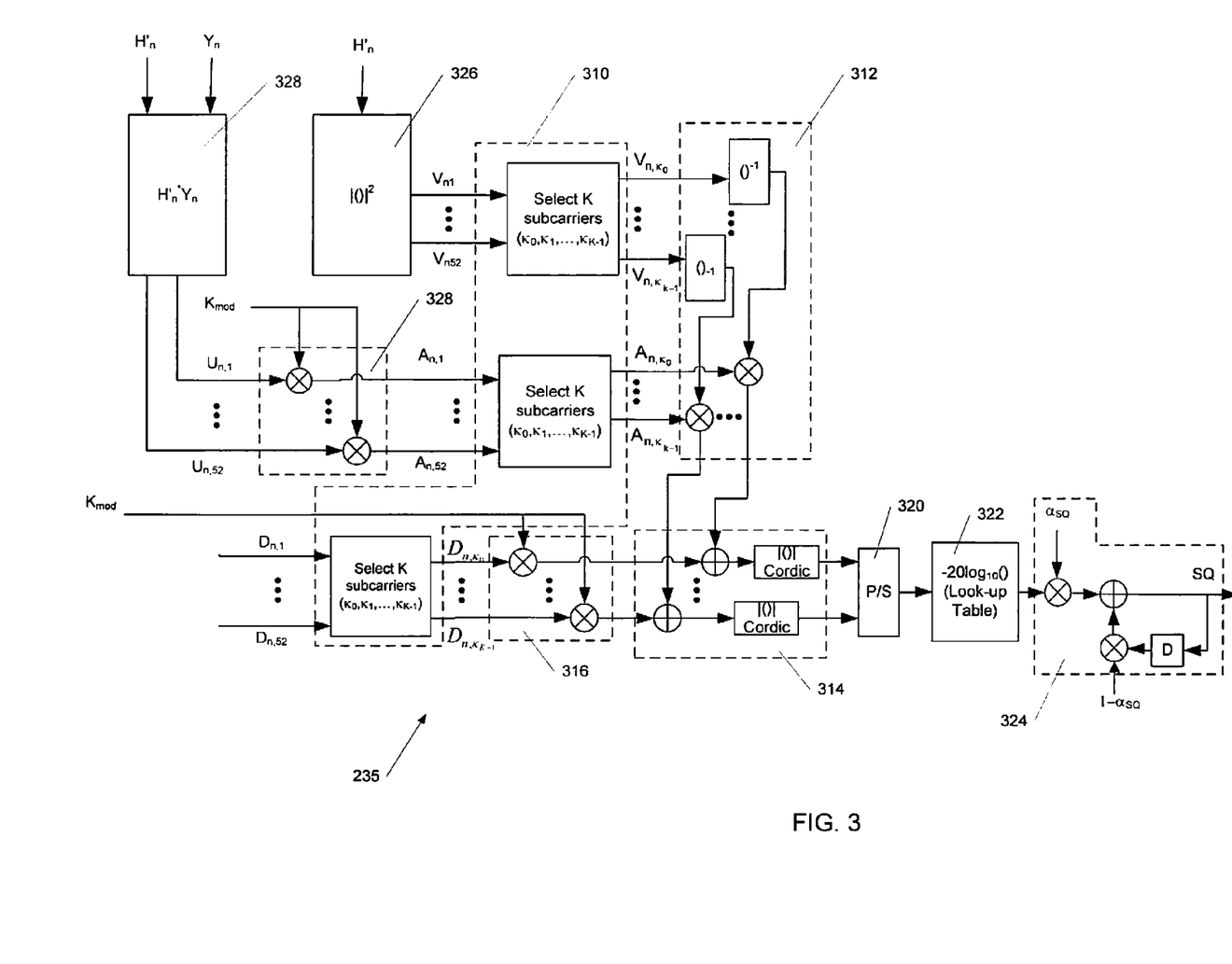
FIG. 3 is a more detailed functional block diagram of the signal-to-noise ratio estimation unit shown in FIG. 2.

After each OFDM symbol is recovered by the FFT 208, soft decision demodulation (phase rotation) and Frequency domain EQualization (FEQ) through a demodulation/FEQ unit 220 is performed on the FFT output to compute a soft decision approximation of its originally transmitted counterpart, denoted as $X_n'$ in the case of received symbol $Y_n$. In particular, the FEQ 220 computes the following:

$$X'_{n,k} = \frac{Y_{n,k}}{H'_{n,k}} = \frac{H'^*_{n,k} \cdot Y_{n,k}}{|H'_{n,k}|^2} \quad (2)$$

for each of the sub-carriers (k=1 . . . 52) forming the symbol Yn. In a straightforward implementation, this computation requires ~2 complex multiplications and one real division per sub-carrier. $H_{n,k}'$ is the estimated channel response or channel estimate for sub-carrier $Y_{n,k}$, and $N_{n,k}$ represents intervening noise, including Additive White Gaussian Noise present in the kth sub-carrier or tone during transmission of the nth OFDM symbol. Note that this is computationally more intensive than implementing the FFT 208 that requires 96 complex multiplications per 52 carriers. The implementation of a division operation can be at least 3~5 times more complex than that of a multiplication operation. Accordingly, as will be discussed in further detail with reference to FIG. 3, the $SNR_{geo}$ estimation unit 235 may share the 52 sub-carrier divider block (e.g. block 312) with the FEQ 220.

Once the soft decision $X'_n$ is computed, it is routed to a Viterbi decoder which uses known Viterbi algorithm techniques, including historical analysis of channel traffic, to find the most likely transmitted bitstream ($b_0 \ldots b_t$) corresponding to the transmitted OFDM symbol Xn, which, depending on intervening noise such as $N_n$, may actually be either be the actual bitstream used to encode transmitted symbol $X_n$ or a close approximation thereof, as is known in the art. Though not shown in FIG. 2, the most likely transmitted bitstream produced by the Viterbi decoder is then descrambled using known 802.11a/g techniques to recover the data of interest which is then passed to the MAC layer interface 125 in the form of a PPDU.

In this embodiment, though not required, hard OFDM symbol by symbol decisions dec $\{X_n'\}$ or $D_n$ of the soft decisions generated by the FEQ 220 are provided to the channel estimator 210 to improve the channel estimates $H_n'$ for successive symbols using known digital feedback analysis techniques. Moreover, these hard decisions are delivered to the SNR estimation unit 235 in order to compute an estimate of the $SNR_{geo}$ which, consistent with the present invention, is used to measure the signal quality of a wireless communications link in a computationally efficient manner.

Generally speaking, the geometric SNR of an OFDM system may be expressed as:

$$SNR_{geo} = \left[\prod_{k=1}^{N} SNR_k\right]^{1/N} \quad (3)$$

In other words, the geometric SNR for all sub-carriers in an OFDM system is the geometric mean of the signal-to-noise ratio on each individual sub-carrier. As discussed above, since there are 52 sub-carriers used in 802.11a/g communications, N=52 in this embodiment. From equation (1), the SNR for sub-carrier k of the nth OFDM symbol within a received 802.11a/g PLCP frame may be expressed as:

$$SNR_{n'k} = \left|\frac{H_{n,k}}{N_{n,k}}\right| = \left|\frac{Y_{n,k}}{H_{n,k}} - X_{n,k}\right|^{-2} \quad (4)$$

However, neither the actual channel response $H_{n,k}$, nor the transmitted symbol $X_k$ is known precisely, and in fact only estimates of each ($H'_{n,k}$, $X'_{n,k}$, $D_{n,k}$ or $\tilde{X}_{n,k}$) are available. Therefore, $SNR_{n,k}$ becomes:

$$SNR_{n'k} \cong \left|\frac{H_{n,k}}{N_{n,k}}\right|^2 = \left|\frac{Y_{n,k}}{H_{n,k}} - K_{mod}D_{n,k}\right|^{-2} \quad (5)$$

and $SNR_{geo}$ for the nth OFDM symbol in the received PLCP frame can be approximated as:

$$SNR_{geo} \cong \left[\prod_{k=1}^{N}\left|\frac{Y_{n,k}}{H'_{n,k}} - K_{mod}D_{n,k}\right|^{-1}\right]^{1/N}, \text{ or} \quad (6)$$

$$SNR_{geo} \cong \left[\prod_{k=1}^{N}|X'_{n,k} - K_{mod}D_{n,k}|^{-2}\right]^{1/N}. \quad (7)$$

Here, $Y_{n,k}$ represents the FFT output, $H'_{n,k}$ represents the channel estimate generated by the channel estimator 210, $X'_{n,k}$ represents the soft decision generated by the FEQ 220, and $D_{n,k}$ represents the hard decision generated by the slicer 225, for the kth sub-carrier of the nth OFDM symbol of the received PLCP frame. $K_{mod}$ here is a normalization constant or scale factor applied to the hard decision based on the sub-carrier constellation being used, such as BPSK, QPSK, 16-QAM or 64-QAM such that each of the sub-carriers have equal power.

Calculating the geometric mean of the difference between the soft and scaled hard decisions for each sub-carrier, as proposed in equations (6) or (7), offers a precise way of obtaining $SNR_{geo}$. However, as would be appreciated by those skilled in the art, implementing this calculation in high-speed hardware is relatively complex, and many of the calculation structures would be unique to an otherwise 802.11a/g compliant baseband processor. Therefore, despite the benefits incurred through ascertaining $SNR_{geo}$ on a per-symbol basis, implementing equations (6) or (7) would unacceptably raise product cost and power consumption, particularly in cost-sensitive mobile wireless communications devices which constitute the present heart of the 802.11a/g market. Therefore, consistent with the present invention, an approximation of equations (6) or (7) is proposed which provides an acceptable approximation of $SNR_{geo}$ on a decibel scale for signal quality estimation purposes, and ultimately a good measure of link quality or link performance for the communications link in which the inbound PLCP frame has been transported. This approximation is mathematically expressed as follows:

$$SNR_{geo,n,dB} \approx Avg.\left[-20\log_{10}\left|\frac{Y_{n,k}}{H'_{n,k}} - K_{mod}D_{n,k}\right|\right], k = 1 \ldots N. \quad (8)$$

In so doing, the geometric mean function expressed in equations (6) or (7) has been replaced by a more computationally efficient average function and, at the same time, $SNR_{geo}$ estimate is directly expressed in the familiar decibel scale.

Moreover, to further simplify the required computation overhead for $SNR_{geo}$, it is further proposed that only a subset of the N sub-carriers need be averaged in order to provide an acceptable estimate of $SNR_{geo}$ for link quality assessment purposes. Though not required, it is suggested that the selected subset of sub-carriers be regularly spaced within the symbol constellation, and that different subsets of the N sub-carriers be used in estimating $SNR_{geo}$ in successive, though not necessarily consecutive OFDM symbols within the same received PLCP frame. Alternatively, the same subset can be used for e.g. a given time interval, a given number of PLCP frames or symbols within a single frame if simplification of the sub-carrier selection process is desired.

For example, assume in an 802.11 a/g OFDM system, a subset of K sub-carriers are selected from a set of N sub-carriers. If K=8, meaning that a subset of 8 sub-carriers are used to estimate $SNR_{geo,n}$, a possible regularly spaced subset could include sub-carriers {1, 8, 15, 22, 29, 36, 43, 50} for the nth OFDM symbol in the received frame. Thus, in this case, every $7^{th}$ sub-carrier is selected for averaging. For the next OFDM symbol n+1, this subset could remain the same, or alternatively, a different subset, partially or fully distinct from the previous subset, may be selected, such as {2, 9, 16, 23, 30, 37, 44, 51}. Of course, this represents only a possible selection strategy to achieve an acceptable $SNR_{geo}$ estimate, either in isolation or over a number of received OFDM symbols or frames, and in fact other selection strategies may be implemented consistent with the present invention as long as a sufficient number of sub-carriers are chosen to provide a representative subset of the symbol constellation.

With consideration given to such sub-carrier subset selection, equation (8) becomes:

$$SNR_{geo,n,dB} \approx Avg.\left[-20\log_{10}\left|\frac{Y_{n,k}}{H'_{n,k}} - K_{mod}D_{n,k}\right|\right], \quad (9)$$

$$k = \kappa_0, \kappa_1, \ldots, \kappa_{K-1}, K \leq N.$$

This relationship can be conveniently implemented by the SNR estimation unit 235 shown in FIG. 2 to provide an $SNR_{geo}$ estimate, and consequently a measure of signal quality SQ on a per received OFDM symbol basis.

A more detailed view of the SNR estimation unit 235 in accordance with the embodiment of FIG. 2 is shown in FIG. 3. Here, block 328 computes the intermediate relationship $U_n$ for the nth received OFDM symbol:

$$U_{n,k} = K_{mod}^{-1}Y_{n,k}H'^*_{n,k}, k=1\ldots N \quad (10)$$

from the channel estimate $H_n'$ and the FFT output $Y_n$. Note that, in so doing, the block 328 can be shared between the SNR estimation unit 235 and the FEQ 220 (see e.g. equation (2) above=$U_{n,k}/V_{n,k}$). Block 326 is likewise used to compute the square of the magnitude of Hn', or intermediate relationship Vn, which may be expressed as:

$$V_{n,k} = |H'_{n,k}|^2, k=1\ldots N \quad (11).$$

Like calculation block 328, calculation block 326 can be shared with the FEQ 220 used to compute $X'_n$.

Still referring to FIG. 3, multiplication block 328 scales the intermediate relationship result $U_{n,1} \ldots U_{n,52}$ by $K^{-1}_{mod}$ to arrive at $A_{n,1} \ldots A_{n,52}$ or $A_n$. Then subsets of both the $V_n$ and $A_n$ results are selected by the sub-carrier selection unit 310. As described above, in this embodiment, the sub-carrier selection unit selects a subset of N sub-carriers $\{\kappa_0, \kappa_1, \ldots, \kappa_{K-1}\}$ regularly spaced-apart in the symbol constellation. The number of sub-carriers, K, selected can vary from 1 to N, but typically K ranges from 8 to 13 in 802.11a/g implementations to develop a reasonable estimate of SNRgeo while reducing the computation required in assessing each sub-carrier of the OFDM symbol. The $A_{n,k}$ and $V_{n,k}$ values corresponding to the selected subset are passed from unit 310 to the division block 312 to compute $A_{n,k}/V_{n,k}$, or $X'_{n,k}$ (see e.g. equation (2)). Here, to cut down on overall circuit complexity, like calculation blocks 326 and 328 discussed above, the division block 312 may be conveniently shared with the soft decision unit or FEQ 220 used to calculate $X'_{n,k}$.

The QAM hard decisions $D_{n,1} \ldots D_{n,52}$ generated by the slicer 225 are also fed to the sub-carrier selection unit 310. The Dn,k values corresponding to the selected subset $\{\kappa_0, \kappa_1, \ldots, \kappa_{K-1}\}$ are passed to the scalar multiplication block 316, which multiplies each by the constant Kmod. The resulting hard decision subset is then presented to block 314 and subtracted from the results provided by the division block 312, and the magnitudes are thereafter extracted. Then, these results are serialized (320), converted into the log domain by the lookup table 322 and averaged by the averaging block 324 to reach the $SNR_{geo}$ estimate after K iterations. This SNRgeo is then sent to the MAC layer controller 128 (FIG. 1) of the MAC interface 125 as a signal quality measure (SQ) for assessing the communications link quality or link performance, and to selectively take correction action responsive thereto, using e.g. known MAC layer link characteristic alteration techniques such as decreasing or increasing data transmission or convolution coding rates, as described above with reference to FIG. 1.

It should be noted that, in this embodiment, intermediate results Un and Vn are calculated for every subcarrier of the received OFDM signal since each are needed for implementing the FEQ 220 which shares calculation blocks 326 and 328. Only those corresponding to the selected sub-carrier subset are passed (by unit 310) to the division block 312. In another embodiment, $H'_n$ and $Y_n$ may be filtered by unit 310 in advance of the $U_n$ and $V_n$ calculations to further reduce complexity at the expense of some degree of sub-carrier selection flexibility as well as potential calculation block sharing. Also, alternatively, calculation for all sub-carriers may proceed to block 314, and then sub-carrier selection implemented by unit 310 may be applied immediately before serialization (block 320) in order to maximize circuitry, block, or unit sharing at the expense of redundant calculations.

Note here, that in the alternative to using the hard decision $D_n$ in estimating $SNR_{geo}$, one may alternatively use a re-coded post Viterbi decision $\hat{X}_n$, in which the most likely transmitted bitstream is re-encoded into a encoded symbol $\hat{X}_n$ using e.g. the re-coder 250 shown in FIG. 2 coupled to the SNR estimation unit 235. The use of re-encoded Viterbi results here does impart an additional delay in determining $SNR_{geo}$ and SQ, but such delay can be accommodated without departing from the teachings of the invention, especially since for link quality estimation purposes, the $SNR_{geo}$ estimate does not change significantly per symbol. In fact, in such case, substituting $\hat{X}_n$ for $D_n$ in equation (9):

$$SNR_{geo,n,dB} \approx Avg.\left[-20\log_{10}\left|\frac{Y_{n,k}}{H'_{n,k}} - \hat{X}_{n,k}\right|\right], \quad (12)$$

$$k = \kappa_0, \kappa_1, \ldots, \kappa_{K-1}, K \leq N.$$

Figure 4:
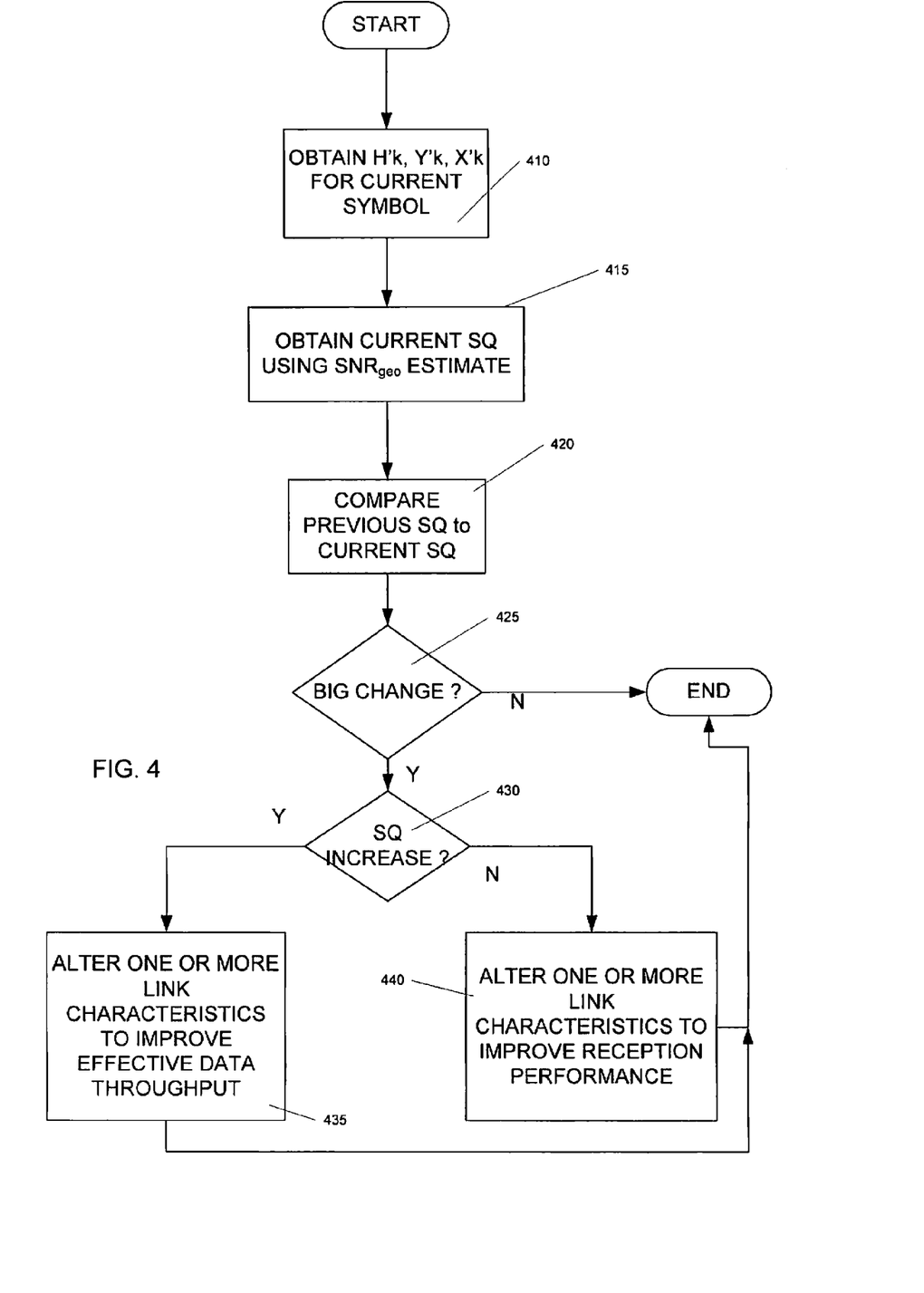
FIG. 4 is flowchart illustrating geometric SNR estimation and link adaptation according to an alternative embodiment of the invention.

While the above-described embodiments are implemented in hardware including a combination of discrete and/or integrated logic, and/or one or more application-specific integrated circuits, the teachings of the present invention are not meant to be so limited. In fact, as will be apparent to those skilled in the art, aspects and features of the present invention, including $SNR_{geo}$ estimation as provided in equations (8) and (9) above, may be conveniently embodied in or implemented by a programmed information processor, such as a general purpose microprocessor or microcontroller or a specific purpose device, such as a programmable digital signal processor. For example, FIG. 4 depicts SQ estimation and selective link characteristic alteration processing according to an alternative embodiment of the invention. In this embodiment, though not required, the processing steps 410-440 are carried out by an information processor programmed in accordance with such steps and in the general sequence shown, as would be recognized by those skilled in the art. Note here that in step 415, calculation of SQ may be conveniently implemented through solving equation (8) highlighted above. In yet another alternative embodiment not shown in FIG. 4, sub-carrier subset selection and SNRgeo estimation consistent with equation (9) is employed. In yet further embodiments, SQ calculation and SQ evaluation/characteristic alteration processing may be handled by separate information processors or their functional equivalents.

It will be obvious to those having skill in the art that many changes may be made to the details of the above-described embodiments without departing from the underlying principles of the invention. For example, though the above-described embodiments are directed to IEEE 802.11a/g wireless communications, the teaching of the present invention are not intended to be so limiting and can, in fact, be extended to other wireless and wireline communications systems, such as communication systems compliant with OFDM xDSL broadband over copper and draft IEEE 802.16a (2002) directed to broadband wireless access. The scope of the present invention should, therefore, be determined only by the following claims.

What is claimed is:

1. A transceiver comprising:
   a receiver configured to receive a radio frequency (RF) signal via a wireless communication link, the wireless communication link having a predetermined link characteristic, the RF signal comprising a plurality of encoded Orthogonal Frequency Division Modulation (OFDM) symbols;
   a receive baseband processor to recover each OFDM symbol encoded within the RF signal, the receive baseband processor comprising
   an estimation unit configured to continuously measure a signal quality of the wireless communication link based on each recovered OFDM symbol; and
   a MAC layer controller configured to selectively alter the predetermined link characteristic of the wireless communication link on an ongoing basis based on the continuously measured signal quality of the wireless communication link.

2. The transceiver of claim 1, wherein the predetermined link characteristic comprises one or more of:
   a convolutional coding and data transmission rate;
   a packet length;
   a transmit power of a transmitter; or
   a gain of the receiver.

3. The transceiver of claim 1, wherein the estimation unit is configured to measure a signal quality of the wireless communication link by estimating a geometric signal-to-noise ratio associated with a given recovered OFDM symbol.

4. The transceiver of claim 1, wherein the geometric signal-to-noise ratio is estimated based on a function of:
   a soft decision associated with the given recovered OFDM symbol; and
   a hard decision associated with the given recovered OFDM symbol.

5. A wireless network device comprising the transceiver of claim 1.

6. The wireless network device of claim 5, wherein the wireless network device comprises an access point.

7. The wireless network device of claim 5, wherein the wireless network device comprises a client station.

8. A method comprising:
   receiving a radio frequency (RF) signal via a wireless communication link, the wireless communication link having a predetermined link characteristic, the RF signal comprising a plurality of encoded Orthogonal Frequency Division Modulation (OFDM) symbols;
   recovering each OFDM symbol encoded within the RF signal;
   continuously measuring a signal quality of the wireless communication link based on each recovered OFDM symbol; and
   selectively altering the predetermined link characteristic of the wireless communication link on an ongoing basis based on the continuously measured signal quality of the wireless communication link.

9. The method of claim 8, wherein the predetermined link characteristic comprises one or more of:
   a convolutional coding and data transmission rate;
   a packet length;
   a transmit power of a transmitter; or
   a gain of a receiver.

10. The method of claim 8, wherein measuring a signal quality of the wireless communication link comprises:
    estimating a geometric signal-to-noise ratio associated with a given recovered OFDM symbol.

11. The method of claim 10, wherein the geometric signal-to-noise ratio is estimated based on a function of:
    a soft decision associated with the given recovered OFDM symbol; and
    a hard decision associated with the given recovered OFDM symbol.

* * * * *